Figure 1:
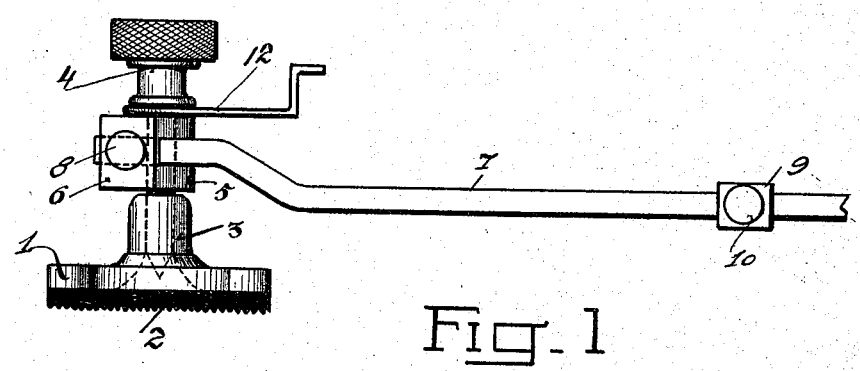

J. LAMBERT.
GLASS CUTTER.
APPLICATION FILED DEC. 26, 1914.

1,146,176.

Patented July 13, 1915.

JOSEPH LAMBERT
Inventor

By

Attorneys

UNITED STATES PATENT OFFICE.

JOSEPH LAMBERT, OF YAMASKA EAST, QUEBEC, CANADA.

GLASS-CUTTER.

1,146,176.  Specification of Letters Patent.  Patented July 13, 1915.

Application filed December 26, 1914.  Serial No. 879,206.

*To all whom it may concern:*

Be it known that I, JOSEPH LAMBERT, a subject of the King of Great Britain, residing at Yamaska East, Province of Quebec, Canada, have invented certain new and useful Improvements in Glass-Cutters; and I do hereby declare that the following is a full, clear, and exact description of the invention, such as will enable others skilled in the art to which it appertains to make and use the same.

The invention to be hereinafter described relates to glass cutters.

In order to more clearly disclose the construction, operation, and use of the invention, reference should be had to be accompanying drawings forming part of the present application.

Throughout the several figures of the drawings like reference characters designate the same parts.

Figure 2:
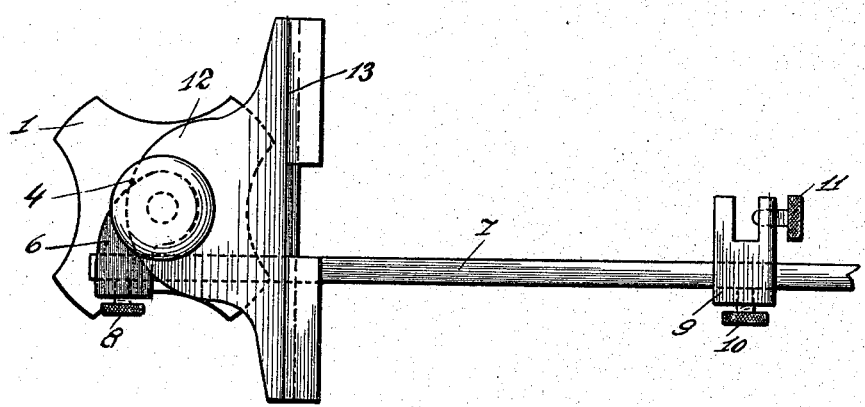

In the drawings: Figure 1 is a side view of the cutter; and Fig. 2 is a top plan view.

The main objects of the invention are, to produce a neat, compact, efficient, and easily operated glass cutter which can be equally well used for cutting either circular or rectangular pieces of glass.

Referring to the drawings in detail, 1 designates the four armed base which is provided, on its under face, with a suitable gripping member 2 of rubber, or other suitable material. The base is provided on its upper face with a centrally located integral post 3 which is bored and threaded to receive the stem of a hand screw 4.

Between the lower end of the head of screw 4 and the top of post 3, a collar 5 is rotatably mounted about the stem of the screw and bears on the upper end of the post. This collar is provided with an integral outwardly curved arm 6 which has a rectangular bore near its outer end which snugly receives the inner end of a beam 7 of rectangular cross section. A binding screw 8 threaded into the outer end of arm 6 engages beam 7 and serves to secure it in position. A forked block 9 is slidably mounted on beam 7, being secured in adjustment by a binding screw 10. One arm of the fork of this block is provided with a binding screw 11 for the purpose of securing the cutting tool in position in the block. The beam may, of course, be graduated, if desired. A plate 12 is secured on the upper end of collar 5 and is provided, at its outer end, with a head 13 formed by bending the plate upwardly at right angles, and then outwardly at right angles. This head is at right angles across beam 7, as shown in Fig. 2.

To cut a circular piece of glass the cutter is held firmly on its base, on the upper face of a sheet of glass, and the beam 7, after the block 9 and the cutting tool carried thereby have been properly adjusted, is revolved about screw 4. This causes the cutting tool to describe a circle and thus cut out a circular piece of glass. To cut a rectangular piece of glass, the cutter is reversed and the head 13 of plate 12 is fitted against and under the edge of the sheet of glass. By moving the cutter along the edge of the glass a rectangular piece will be cut, the cut being made parallel with the edge of the sheet and the width of the piece cut depending on the adjustment of the cutting tool along beam 7.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

In a device of the character described, a base having an integral centrally located and centrally bored and threaded post on its upper face, a hand screw threaded into the said post, a collar rotatably mounted about said screw above the post and provided with an integral outwardly curving arm provided with a rectangular bore near its outer end, a beam of rectangular cross section adapted to fit into the bore in said arm, means for securing the beam in the arm, a forked block slidably adjustable on the said beam, means for securing the said block in adjustment, means for securing a cutting tool in the fork of the said block, and a plate secured to the upper end of the said collar and having an integral head at right angles to the said beam, the said head being formed by bending the plate upwardly at right angles and then outwardly at right angles.

In witness whereof I have hereunto set my hand in the presence of two witnesses.

JOSEPH LAMBERT.

Witnesses:
 JÉRÍMIE CARTIER,
 Ls. VÉRONNEAU.

Copies of this patent may be obtained for five cents each, by addressing the "Commissioner of Patents, Washington, D. C."